United States Patent [19]
Peters et al.

[11] 3,945,472
[45] Mar. 23, 1976

[54] LEVER ACTUATED BRAKE ASSEMBLY

[76] Inventors: Jack Peters, 24008 Bessemer St., Woodland Hills, Calif. 91364; DeLoris Joan Barrett, 6206 Satsuma Ave., Hollywood, Calif. 91606

[22] Filed: July 8, 1974

[21] Appl. No.: 486,704

[52] U.S. Cl. .................. 188/72.7; 188/22; 188/59; 188/72.9; 192/93 R; 192/99 S
[51] Int. Cl.² ........................................ F16D 55/228
[58] Field of Search ............ 188/22, 59, 72.7, 72.9; 192/99 A, 99 S, 93 R

[56] References Cited
UNITED STATES PATENTS

| | | | |
|---|---|---|---|
| 118,107 | 8/1871 | Clapp | 188/72.9 |
| 1,701,188 | 2/1929 | Miller | 188/22 |
| 2,365,369 | 12/1944 | Williams | 188/72.7 |
| 2,855,074 | 10/1958 | Casey | 188/72.7 |
| 2,911,070 | 11/1959 | Seelig, Jr. | 188/59 |
| 2,987,142 | 6/1961 | Gracie, Jr. | 188/72.9 X |
| 3,096,853 | 7/1963 | Farrand | 188/72.7 X |

*Primary Examiner*—George E. A. Halvosa
*Attorney, Agent, or Firm*—Pollock, Vande Sande & Priddy

[57] ABSTRACT

A brake assembly is disclosed in which a first pivoted lever receives and transmits brake actuating force to a second pivoted lever via rollers which transfer force between the two levers at a point which, due to the geometry of the second lever, moves progressively closer to the pivot point of the first lever and farther from the pivot point of the second lever as force is applied to the first lever.

9 Claims, 5 Drawing Figures

LEVER ACTUATED BRAKE ASSEMBLY

CROSS REFERENCE TO RELATED APPLICATIONS

The invention disclosed in this application is especially adapted for use with hand truck assemblies such as disclosed in application Ser. No. 299,568 filed Oct. 20, 1972 now U.S. Pat. No. 3,811,633 by Jack Peters and Easton D. New and Ser. No. 486,942 by Jack Peters and D. J. Barrett filed concurrently herewith.

SUMMARY OF THE INVENTION

The prior art discloses many types of brake apparatus which are designed to slow and stop the movement of an adjacent rotor or wheel. Due to the large amount of force required to stop rotors moving at high speeds and carrying large weights having a high momentum tending to maintain movement of the rotor or wheel, it has frequently been necessary to provide electrical or hydraulic power actuators for prior art braking systems. This is because many manually actuated mechanical systems require the operator to apply such large actuation forces that adequate brake application may not be possible for some individuals.

The brake apparatus disclosed in this application is of the general type wherein a caliper assembly is caused to grip the moving periphery of a rotor or wheel to be stopped. A simple mechanical assembly is disclosed which will stop a rotor or wheel having great momentum force tending to maintain its rotation and restrain the wheel from further movement, with a minimum amount of force required to be applied by the operator.

An object of the invention is to provide a brake assembly which may be actuated with ease by hand, without requiring the use of power assist devices. A further object is to provide a brake in which the only adjustments to be made are for shoe wear during use. Yet another object is to provide a brake assembly suited for use on hand trucks, which may be locked to hold the hand truck on a grade.

To these ends, the invention includes a brake shoe having a plurality of cooperating actuating levers to provide an increased mechanical advantage for the operators. Direct mechanical interconnection minimizes wear effects and permits locking of the brake when desired.

DESCRIPTION OF THE PREFERRED EMBODIMENT

Figure 1:
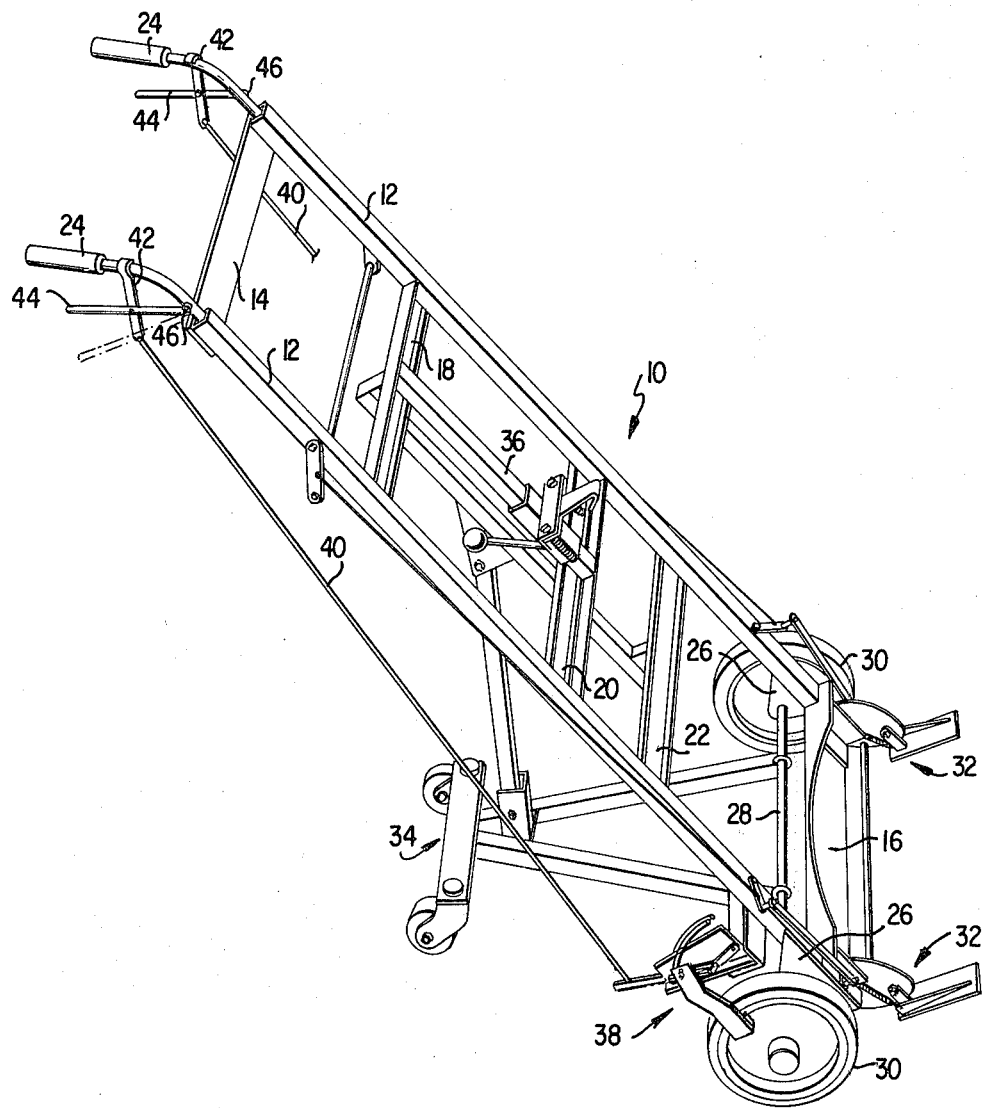
FIG. 1 shows a perspective view taken from above a hand truck assembly embodying the brake apparatus of this invention, generally designated at element 38.

There follows a detailed description of a preferred embodiment of the invention, reference being had to the drawings in which like reference numerals indicate like elements of structure in each of the several Figures.

The brake assembly of the invention is suitable for use in a wide variety of applications where a wheel or rotor is to be slowed and stopped; however, for purposes of illustration, its use in association with a hand truck of the type disclosed in applicants' application Ser. No. 486,942 filed concurrently herewith is illustrated in FIG. 1. The hand truck comprises an elongated frame 10 made up of side rails 12 which are joined at the upper and lower ends by lateral brace plates 14 and 16 and further braced by upper, middle and lower lateral brace beams 18, 20 and 22. Handles 24 are attached to the upper ends of side rails 12 for convenience of the operator. At the lower end of the elongated frame 10, axle support legs 26 are attached, between which extends axle 28, having wheels 30 mounted on the outboard ends thereof. Selectively adjustable load bearing shoe plate assemblies 32 are affixed to the lower end of elongated frame 10 on the side opposite from axles support legs 26, as fully described in application Ser. No. 486,942. An auxiliary support wheel assembly 34 may also be affixed to the elongated frame 10 as described more fully in application Ser. No. 299,568, filed Oct. 20, 1972. Barrel hook assembly 36 permits restraint of the upper lip or surface of a barrel or other article to be carried. The lever actuated brake assembly of the invention is indicated generally by reference numeral 38 and is actuated by lever 40 which, in turn, is pivotably attached to brake locking hook 42 which is pivotably actuated by hand lever 44, located adjacent handles 24. Generally, it is desirable to place the brake assemblies 38 in position to cooperate with each of wheels 30.

Figure 2:
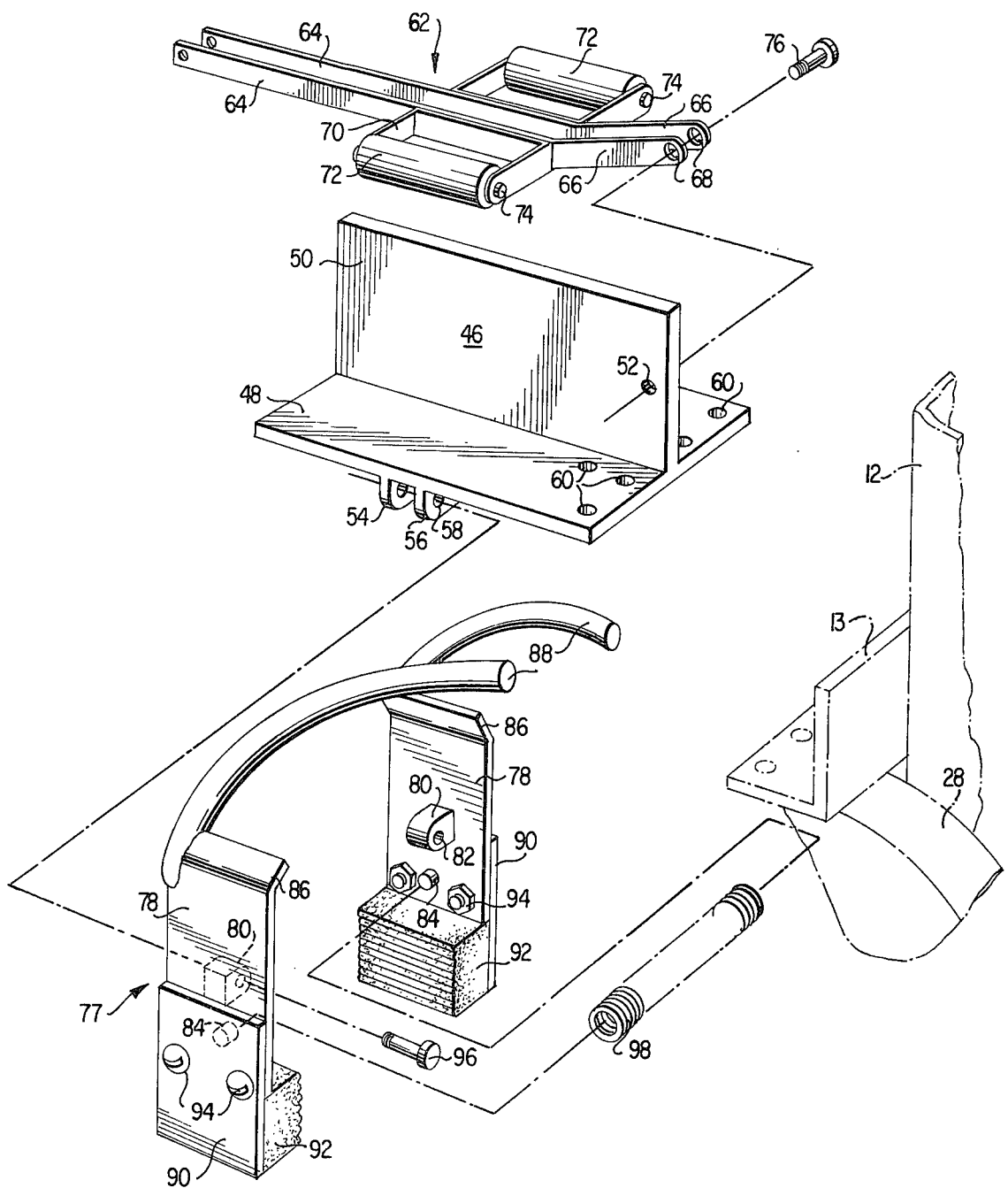
FIG. 2 shows an exploded perspective view of a brake assembly according to the invention, including a phantom illustration of its attachment to a hand cart such as shown in FIG. 1.

FIG. 2 shows the various component parts of the brake assembly according to the invention. Side rail 12, brake attachment flange 13 and wheel 28 are shown partially in phantom to illustrate one actual application of the invention. A T-shaped frame 46 is used as the basic mounting frame for the brake assembly and includes an essentially rectangular base plate 48 and an integral upstanding plate 50. A through bore 52 is provided near the mid-point of upstanding plate 50 at one end thereof for attachment of the brake roller levers 62. At approximately the mid-portion of the under surface of base plate 48 are attached brake arm support flanges 54 and 56 which extend across the under surface of base plate 48 (see FIG. 4). Brake arm support flanges 54 and 56 include through bores 58 for mounting the brake lever assemblies 77. Bores 60 are provided in base plate 48 as necessary for attachment to support flange 13.

Brake roller levers 62 include straight segments 64 of conventional bar stock and upwardly bent segments 66 having bores 68 therein for pivotal attachment to upstanding plate 50 at bore 52. Roller brackets 70 extend laterally of straight segments 64 as shown and are suitably apertured to receive rollers 72 mounted on axles 74. Pivot bolt 76 provides connection between brake roller levers 62 and upstanding plate 50 at bore 52.

Brake lever assemblies 77 include brake arms 78 which are essentially rectangular segments of bar stock having attachment bosses 80 including bores 82 affixed to the inner surfaces thereof. Spring retainer bosses 84 are affixed to brake arms 78 below attachment bosses 80. At the upper ends of brake arms 78 are located inwardly bent portions 86 which are deflected from the plane of brake arms 78 approximately 60°. Attached to inwardly bent portions 86 are brake arm extensions 88 which are illustrated as being made from round bar stock and are bent within a plane including inwardly bent portions 86 into a circular arc, extending toward the pivot bolt 76 and away from boss 80 and having sufficient length to permit contact with rollers 72 throughout the entire range of motion of brake roller levers 62. In practice, it has been found convenient to use a radius for this arc equivalent to the distance between the center line of bore 52 and the initial point of contact between brake arm extension 88 and roller 72, as indicated at "R" in FIG. 3. At the lower end of brake arms 78 are attached brake shoe plates 90 and shoe pads 92, using suitable fasteners such as screws or rivets, indicated at 94. A pivot bolt 96 secures bosses 80 between brake arms support flanges 54 and 56. A bias spring 98 is located between brake arms 88 in engagement with retainer bosses 84 and serves to bias the assembly out of contact with the adjacent wheel.

Figure 4:
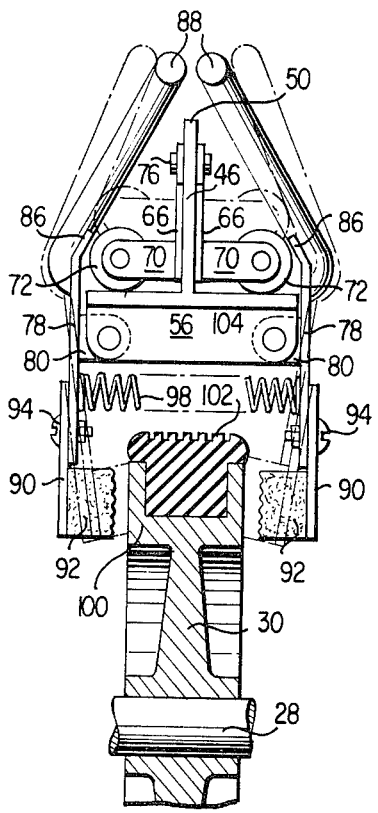
FIG. 4 shows a front elevation view of the invention, partially in section, taken along line 4—4 of FIG. 3.
Figure 3:
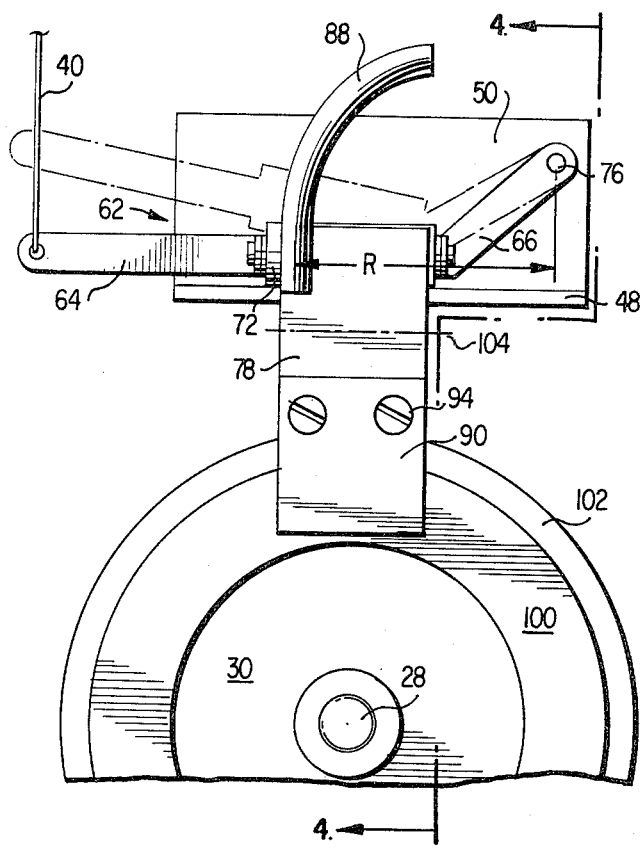
FIG. 3 shows a side elevation view of the invention, indicating its relative orientation to the rotor or wheel to be slowed or stopped and showing in phantom successive positions the brake actuating lever.

FIG. 3 shows a side view of the assembly indicating in phantom a second position of brake roller levers 62. As may be seen from the phantom position of levers 62, the point of contact between rollers 72 and brake arm extensions 88 moves along rollers 72 toward pivot bolt 76 as levers 62 are raised in response to force supplied via cable 40. The point of contact on extension 88 also moves further from pivot axis 104 of brake arm 78. FIG. 4 shows a view, partially in section taken along line 4—4 of FIG. 3, indicating the mode of engagement between rollers 72 and brake arm extensions 88 and between brake shoe pads 92 and wheel rim 100. The progressive movement of brake arm extensions 88 and brake shoe pads 92 is indicated in phantom as brake roller levers 62 are rotated. Although the brake shoe pads 92 are shown contacting the metal rim 100 of wheel 30, it will be apparent that the invention may also be applied directly to the side walls of tire 102.

Figure 5:
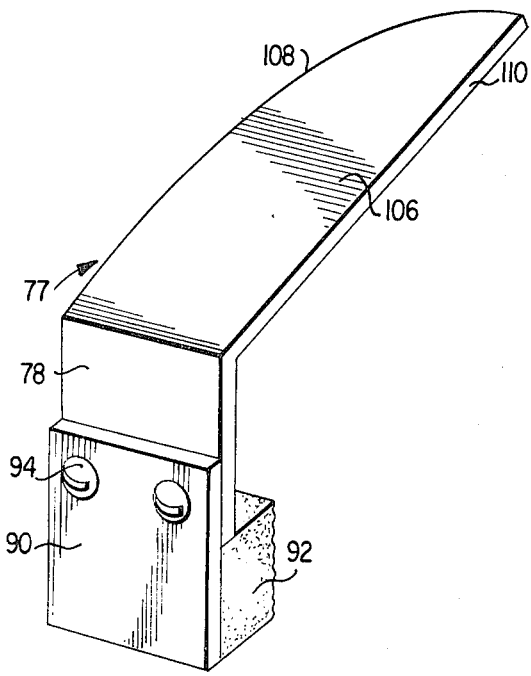
FIG. 5 shows an alternate form of the brake arm of the invention.

FIG. 5 shows an alternative embodiment of brake lever assemblies 77 in which the brake arm extensions 88 and the inwardly bent portions 86 have been replaced by an inwardly bent portion 106 integral with the upper end of brake arms 78. Inwardly bent portions 106 include a curved edge 108 which follows essentially the same circular arc as do brake arm extensions 88, discussed above, and extends from one side of brake arms 78 to join edge 110 extending from the other side of brake arms 78. Due to the changing contact line between inwardly bent portions 106 and rollers 72 as brake roller levers 62 are raised, the effective contact point between the two moves closer to the pivot point of brake roller levers 62 and further from the pivot axis 104 of brake lever assemblies 77.

In operation, the brake assembly is affixed in any suitable manner adjacent the rotor or wheel to be slowed and stopped as indicated generally in FIGS. 1, 3 and 4. When the motion of the rotor or the wheel is to be slowed or stopped, the operator causes brake roller levers 62 to be rotated about pivot bolt 76, thereby causing brake lever assemblies 77 to rotate about pivot axis 104, forcing brake shoe pads 92 to contact and stop wheel or rotor assembly 30. With reference to FIG. 1, an embodiment of a brake actuating linkage is shown, in which brake locking hooks 42 may be affixed over handles 24 as shown in order to secure the brake in its engaged position to hold the hand truck in a desired location. Of course, any type of mechanical actuating system may be used which will rotate brake roller levers 62 about pivot 76.

The unique geometry of the invention permits the brake to be applied with a minimum of force applied to the end of straight segments 64 of brake roller levers 62. This is because as brake roller levers 62 are raised, the point of contact between roller 72 and brake arm extensions 88 or 106 is changing constantly, radially relative to pivot bolt 76 and pivot axis 104. Since the effective distance between pivot bolt 76 and the point of contact of roller 72 with extension 88 is continually shortening, the force available for transmission from brake roller levers 62 to brake lever assemblies 77 is seen to be increasing for a constant force to levers 62. At the same time that the force to be transmitted from brake roller lever 62 to brake lever assemblies 77 is growing due to the shortening of one lever arm, the effective lever arm between pivot axis 104 and the point of contact between brake arm extension 88 or 106 and rollers 72 is simultaneously increasing. Thus, the product of this lever arm and force is continually growing as brake roller levers 62 are raised, resulting in an increased force available for application to wheel or rotor 30. The superior mechanical advantage provided by the cooperating levers and rollers of the invention permits actuation of the brake assembly with a minimum application of force to brake roller levers 62. Thus, it will be unnecessary in many applications to provide additional brake applying force from power-assisted brake actuating means. The simple structure of the invention is such that no brake adjustment is required, other than pad replacement.

Having described out invention in such detail as to enable one in the art to make and use it, we claim:

1. A brake apparatus comprising:
   a first lever;
   first pivot means for said first lever;
   at least one brake lever;
   second pivot means for said at least one brake lever;
   at least one brake shoe supported by said at least one brake lever; and
   means responsive to the pivoting of said first lever about said first pivot means as the brake is applied for applying a force from a first point which moves along the length of said first lever in a direction to increase the mechanical advantage of said first lever, to a second point which moves along the length of said at least one brake lever to concurrently increase the mechanical advantage of said at least one brake lever whereby pivoting of said first lever to apply braking force provides a continuous change in the effective length of both said levers and a continuous increase in the mechanical advantage of both said first lever and said at least one brake lever.

2. A brake apparatus as in claim 1, wherein said responsive means comprises a portion of said at least one brake lever positioned to be contacted by said first lever as it is pivoted, said portion being shaped to extend from said at least one brake lever along a path toward said first pivot means of said first lever and away from said second pivot means of said at least one brake lever.

3. A brake apparatus as in claim 2, wherein said responsive means further comprises roller means rotatably mounted on said first lever for contacting said portion of said at least one brake lever as said first lever is pivoted.

4. A brake apparatus as claimed in claim 2, wherein said portion of said at least one brake lever is curved in an arc, the arc extending toward said first pivot means of said first lever and away from said second pivot means of said at least one brake lever and having sufficient length to permit contact with said first lever throughout the range of motion of said first lever.

5. A brake apparatus as in claim 1, further comprising means for biasing said at least one brake shoe out of contact with an element to be braked.

6. The brake apparatus of claim 1 which further includes:
   a third lever attached pivotally to a third pivot means for actuation simultaneously with said first lever,
   a second brake lever attached pivotally to a fourth pivot means for actuation simultaneously with said one brake lever,
   said second brake lever having a second brake shoe positioned thereon,
   and further means responsive to the pivoting of said third lever about said third pivot means as the brake is applied for applying a force from a third point which moves along the length of said third lever in a direction to increase the mechanical advantage of said third lever to a fourth point which moves along the length of said second brake lever to concurrently increase the mechanical advantage of said second brake lever.

7. A brake apparatus as in claim 6, further comprising rollers rotatably mounted on said first and third levers and contacting the first and second brake levers as the first and third levers are pivoted.

8. A brake apparatus as in claim 6, wherein said responsive means and also said further responsive means comprise respective extensions of said brake levers positioned to be contacted respectively by the first and third levers as the first and third levers are pivoted, said extensions being shaped to protrude from said brake levers along respective paths toward said first and third pivot means of the first and third levers and away from said second and fourth pivot means of said brake levers, respectively.

9. The brake apparatus of claim 1 which further includes means for applying a brake actuating force to said first lever at a predetermined location thereon, said first lever including means thereon intermediate said first pivot means and said predetermined location for applying force to said at least one brake lever,
   said at least one brake lever supporting adjacent one end thereof said at least one brake shoe and including means adjacent its opposite end against which is applied the force from said first lever, said second pivot means being positioned intermediate the ends of said at least one brake lever.

* * * * *